US009600380B2

(12) United States Patent
Mizuno et al.

(10) Patent No.: US 9,600,380 B2
(45) Date of Patent: Mar. 21, 2017

(54) FAILURE RECOVERY SYSTEM AND METHOD OF CREATING THE FAILURE RECOVERY SYSTEM

(71) Applicant: HITACHI, LTD., Tokyo (JP)

(72) Inventors: Kazuhiko Mizuno, Tokyo (JP); Michitaka Okuno, Tokyo (JP); Yuji Tsushima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 187 days.

(21) Appl. No.: 14/540,615

(22) Filed: Nov. 13, 2014

(65) Prior Publication Data
US 2015/0149813 A1 May 28, 2015

(30) Foreign Application Priority Data

Nov. 26, 2013 (JP) ................. 2013-244190

(51) Int. Cl.
G06F 11/00 (2006.01)
G06F 11/14 (2006.01)
G06F 11/30 (2006.01)
G06F 11/20 (2006.01)
(Continued)

(52) U.S. Cl.
CPC ...... *G06F 11/1484* (2013.01); *G06F 11/1438* (2013.01); *G06F 9/45558* (2013.01); *G06F 11/2035* (2013.01); *G06F 11/301* (2013.01); *G06F 11/3006* (2013.01); *G06F 11/3051* (2013.01); *G06F 11/3055* (2013.01); *G06F 11/3409* (2013.01); *G06F 2009/45575* (2013.01); *G06F 2009/45591* (2013.01); *G06F 2201/81* (2013.01); *G06F 2201/86* (2013.01)

(58) Field of Classification Search
CPC ................................... G06F 11/2028
See application file for complete search history.

(56) References Cited

U.S. PATENT DOCUMENTS 7,213,246 B1 * 5/2007 van Rietschote ... G06F 11/1482
707/999.202
7,500,001 B2 3/2009 Tameshige et al.
(Continued)

FOREIGN PATENT DOCUMENTS

JP 2005-141605 A 6/2005
JP 2007-088949 A 4/2007
(Continued)

OTHER PUBLICATIONS

VMWARE, Inc., "vSphere Availability; ESXi 5.5; vCenter Server 5.5", 2009.
(Continued)

*Primary Examiner* — Christopher McCarthy
(74) *Attorney, Agent, or Firm* — Volpe and Koenig, P.C.

(57) ABSTRACT

When detecting the configuration change or the operating state of a virtual machine of the main system, a VM management unit changes a value of a determination index of the virtual machine, and selects a virtual machine of the standby system/auxiliary system used for failure recovery of the virtual machine of the main system on the basis of a value of the determination index. A pattern generation unit provides the virtual machine of the standby system/auxiliary system selected by the VM management unit.

14 Claims, 12 Drawing Sheets

(51) Int. Cl.
  *G06F 11/34* (2006.01)
  *G06F 9/455* (2006.01)

(56) References Cited

U.S. PATENT DOCUMENTS

| | | | |
|---|---|---|---|
| 8,185,893 B2* | 5/2012 | Hyser | G06F 9/5027 |
| | | | 718/1 |
| 8,264,989 B2 | 9/2012 | Suzuki | |
| 9,032,133 B2* | 5/2015 | Schmidt | G06F 11/203 |
| | | | 711/6 |
| 2007/0067462 A1 | 3/2007 | Takeda | |
| 2008/0189468 A1* | 8/2008 | Schmidt | G06F 11/203 |
| | | | 711/6 |
| 2014/0059380 A1* | 2/2014 | Krishnan | G06F 11/1415 |
| | | | 714/15 |
| 2014/0122920 A1* | 5/2014 | Ziskind | G06F 11/1484 |
| | | | 714/4.11 |
| 2015/0058663 A1* | 2/2015 | Schmidt | G06F 11/203 |
| | | | 714/6.24 |

FOREIGN PATENT DOCUMENTS

| | | |
|---|---|---|
| JP | 2008-118236 A | 5/2008 |
| JP | 2011-211490 A | 10/2011 |

OTHER PUBLICATIONS

NTT Communications Corporation, "Ministry of Economy, Trade and Industry Fiscal 2011; Development and demonstration testing of next-generation, highly reliable, energy-saving core IT technologies, Research and development for improving accountability of cloud computing, Project report", Mar. 30, 2012.

\* cited by examiner

303

| 500 Secondary Information | | | | | | | | | | | | 501 Primary Information | | | | | | | | | |
|---|---|---|---|---|---|---|---|---|---|---|---|---|---|---|---|---|---|---|---|---|---|
| 502 Pattern # | 503 S-VM # | 504 S-CPU [core] | 505 S-Memory [GB] | 506 S-VNIC# | 507 S-PNIC# | 508 S-VNIC States | 509 Power Status | 510 S-Blade # | 511 S-Chassis# | 512 Status | 513 P-VM# | 514 P-VNIC# | 515 VNIC States | 516 IP | 517 MAC | 518 P-PNIC# | 519 P-Blade# | 520 P-Chassis# | 521 Power Setup | 522 Priority |
| 1 | 1 | 2 | 10 | 1 | 1 | S | Standby | 1 | 1 | — | 4 | 1 | S | **** | **** | 1 | 2 | 1 | 1 | 1 |
| 2 | 2 | 3 | 20 | 1 | 2 | S | Standby | 2 | 1 | — | 1 | 1 | S | **** | **** | 1 | 1 | 1 | 1 | 1 |
| | | | | | | | | | | | 2 | 2 | S | **** | **** | 1 | 1 | 1 | 1 | 1 |
| 3 | 3 | 3 | 10 | 2 | 2 | S | Down | 1 | 1 | main | 5 | 3 | S | **** | **** | 2 | 2 | 1 | 0 | 1 |
| 4 | 4 | 4 | 50 | 3 | 3 | S | Down | 2 | 1 | main | 3 | 3 | S | **** | **** | 1 | 1 | 1 | 0 | 1 |
| 5 | 5 | 3 | 20 | 2 | 2 | S | Down | 2 | 1 | reserve | 1 | 1 | S | **** | **** | 1 | 1 | 1 | 1 | 1 |
| | | | | | | | | | | | 2 | 2 | S | **** | **** | 1 | 1 | 1 | 1 | 1 |
| .. | .. | .. | .. | .. | .. | | .. | .. | .. | .. | .. | .. | | .. | .. | .. | .. | .. | .. | .. |

FIG.5

| 600 date | 601 VM# | 602 CPU core | 603 CPU States | 604 Memory [GB] | 605 VNIC# | 606 VNIC States | 607 PNIC# | 608 Blade# | 609 Chassis# |
|---|---|---|---|---|---|---|---|---|---|
| 2013.01.01 09:00 | 1 | 3 | S | 20 | 1 | S | 1 | 1 | 1 |
| | 2 | 3 | S | 20 | 2 | S | 1 | 1 | 1 |
| | 3 | 4 | S | 50 | 3 | S | 1 | 1 | 1 |
| | 4 | 2 | S | 10 | 1 | S | 1 | 2 | 1 |
| | 5 | 3 | S | 10 | 2 | S | 1 | 2 | 1 |
| .. | | | | | | | | | .. |

| 516 IP | 517 MAC | 610 CPU Usage[%] | 611 IOPS | 612 Memory Usage[%] | 613 Event Count | 614 Threshold | 522 Priority |
|---|---|---|---|---|---|---|---|
| ******* | ******* | 20 | 100 | 30 | 20 | 10 | 1 |
| ******* | ******* | 20 | 80 | 30 | 0 | 10 | 1 |
| ******* | ******* | 20 | 60 | 30 | 20 | 10 | 1 |
| ******* | ******* | 30 | 20 | 40 | 15 | 10 | 1 |
| ******* | ******* | 30 | 60 | 20 | 0 | 10 | 1 |
| .. | | | | | | | |

| 600 date | 609 Chassis# | 608 Blade# | 700 Total CPU [core] | 701 Total Memory [GB] | 702 Total VNIC# | 703 Total PNIC# | 704 PNIC Info | | | |
|---|---|---|---|---|---|---|---|---|---|---|
| | | | | | | | 705-1 PNIC# | 706-1 Bandwidth [GB] | 705-2 PNIC# | 706-2 Bandwidth [GB] |
| 2013.01.01 09:00 | 1 | 1 | 8 | 50 | 8 | 2 | 1 | 10 | 2 | 10 |
| | 1 | 2 | 8 | 50 | 8 | 3 | 1 | 10 | 2 | 10 |
| | .. | .. | .. | .. | .. | .. | .. | .. | .. | .. |
| .. | | | | | | | | | | |

FAILURE RECOVERY SYSTEM AND METHOD OF CREATING THE FAILURE RECOVERY SYSTEM

CLAIM OF PRIORITY

The present application claims priority from Japanese patent application JP 2013-244190 filed on Nov. 26, 2013, the content of which is hereby incorporated by reference into this application.

BACKGROUND OF THE INVENTION

1. Field of the Invention

The present invention relates to a failure recovery system, and a method of creating the failure recovery system, and more particularly to a technique for reducing the amount of resources used for a redundant configuration, and reducing a failure recovery time in the redundant configuration equipped with a virtual server which is a switching destination when a common failure occurs in plural virtual servers providing a communication service.

2. Description of the Background Art

With the spread of cloud computing, data centers provided by data center providers or communication carriers are increasingly used. In general, the data centers are frequently installed at remote locations, and accessed via a local area network (LAN) or a wide area network (WAN) in use.

In the network using the WAN, a communication speed becomes low because a line quality is low as compared with the network using the LAN. Under the circumstances, in recent years, the development of a WAN acceleration technology has been promoted, and a WAN acceleration device is provided in each vendor. In general, the WAN acceleration device is installed as a relay device that connects the LAN and the WAN on a client side, and the LAN and the WAN on a data center side. The WAN acceleration device controls data communicated between the client and the data center to improve the communication speed of the WAN.

In the WAN acceleration technique or the WAN acceleration devices, with the widespread use of the virtualization technique, the virtualization of the communication service including the WAN acceleration technique is being promoted. Also, a general-purpose server is used for an appliance device such as the WAN acceleration device, and technical development such as the virtualization of the device compatible with a multitenant in which the virtual environment is created in the server to aggregate the respective communication services into the same server is being promoted. In the application of the above virtualization mechanism, in order to provide a high availability at the time of failure of the communication service, a management mechanism provided in the virtualization mechanism is used.

Also, in a large-scale environment such as a data center, when the amount of resources of physical servers allocated to the individual virtual servers are set, separately, there is a possibility that a load on a manager increases in terms of the environment creation and maintenance. Under the circumstances, taking the amount of resources that can be allocated in the applied virtualization mechanism, and customer demands into account, a configuration of the virtual server provided to the data center is patterned to facilitate operational management.

As a background art of the technical field that provides the high availability in the communication service and an appliance device employing the virtualization mechanism, there are provided a technique in which when a failure occurs in a virtual machine (VM), the failure target VM automatically restarts, and a technique in which a redundant configuration including a VM that runs the communication service, and a VM of a standby system which is a switching destination at the time of failure is produced, and the system is switched to another at the time of failure (failover) so that the communication service can be continued (refer to "vSphere Availability ESXi5.5 vCenter Server 5.5"). Also, when the above redundant configuration is produced, there is a need to ensure physical resources such as a CPU and a memory with the inclusion of the standby system side in advance. Under the circumstances, there is provided a technique in which a VM of a standby system which is a switching destination at the time of failure to a plurality of VMs that run the communication service is shared so that the physical resources used by the standby system VM are deleted, and the plurality of VMs that provide the communication service are synchronized with the processing of the shared standby system VM so that the failure recovery time is reduced (refer to "Research and development projects business report to improve the accountability of cloud computing, next generation high reliability and energy-efficient IT infrastructure technology development and demonstration projects in 2011 by Ministry of Economy, Trade and Industry" in Mar. 30, 2012, page 103-108).

Also, JP-A-2005-141605 discloses a technique in which a standby state of a computer is transited by a prediction of a load state.

SUMMARY OF THE INVENTION

As disclosed in "vSphere Availability ESXi5.5 vCenter Server 5.5", when the redundant configuration is produced, the failure recovery is enabled by the restart of the VM and the failover of the VM. When the VM restarts, because the VM of the standby system which is a switching destination does not use the physical resources in a normal operation, the VM of a main system which provides the communication service can freely use the physical resource. However, because there is a need to restart the VM of the main system in the failure, a communication interruption time occurs in a start time of the VM, there arises such a problem that a restart time of the communication service is delayed. Also, when the VM is subjected to failover, the redundant configuration of the main system VM and the standby system VM one-to-one is provided, and an execution state of the main system VM is synchronized with the standby system VM. For that reason, the communication service can be continued by the standby system VM without any interruption in the failure. However, because in the standby system VM, a load is applied by synchronization with the main system VM, the standby system VM uses the physical resources. Therefore, when this redundant configuration is used, there is a need to ensure the physical resources taking both of the main system VM and the standby system VM into account, which is problematic.

In the technique in which the standby system VM is shared as disclosed in "Research and development projects business report to improve the accountability of cloud computing, next generation high reliability and energy-efficient IT infrastructure technology development and demonstration projects in 2011 by Ministry of Economy, Trade and Industry", it is possible to delete the physical resources used by the standby system VM. However, when the physical resources to be allocated to the standby system VM are simply set on the basis of the physical resources allocated to the plural main system VMs, the amount of physical resources allocated to a certain main system VM has the potential to be different from the amount of physical resources allocated to the standby system VM, which may greatly affect the performances before and after the failure. Also, because the number of main system VMs is different from the number of standby system VMs, failure recovery may not be conducted on the plural main system VMs. "Research and development projects business report to improve the accountability of cloud computing, next generation high reliability and energy-efficient IT infrastructure technology development and demonstration projects in 2011 by Ministry of Economy, Trade and Industry" has proposed a mechanism in which a physical server is prepared separately, and the main system VMs that are sequentially subjected to the failure recovery are shifted to the physical server prepared separately. In this case, there is a need to prepare the physical server which is a destination, separately, and the effect of decreasing the physical resources of the standby system VM may be reduced.

As described above, in the related art, the technique in which if a failure occurs in the main system VM, the VM is subjected to the fail-over by the redundant configuration of 1:1 to reduce the failure recovery time conflicts with the technique in which the standby system VM is shared to reduce the amount of resources in the standby system VM. Therefore, it is difficult to effectively provide the advantages of both those techniques, which is problematic. Also, when the standby system VM is shared, a reduction in the failure recovery time and a reduction in the amount of resources in the standby system VM can be expected. However, there is a possibility that the failure recovery is not rapidly conducted on the plural main system VMs, and the physical server to which the main system VM subjected to the failure recovery is shifted is required, which are problematic.

In view of the above viewpoints, an object of the present invention is to provide a failure recovery system which reduces the amount of physical resources of the standby system VM as much as possible, recovers the main system VM in the failure recovery time as short as possible when failure occurs, and appropriately recovers the failure of the plural main system VMs, and a method of creating the failure recovery system.

According to the first solving means of the present invention, it is provided a failure recovery system, comprising:

a plurality of first virtual machines of a main system that provides a given communication service;

a second virtual machine of a standby system whose power supply state is a semi-operating state, which is used as a switching destination for recovering failure when the failure occurs in any one of the plurality of first virtual machines of the main system;

a virtual machine management unit that monitors at least any one of a configuration change and an operating state of the plurality of first virtual machines of the main system, and updates an index indicative of a possibility that the failure occurs when detecting the configuration change or the change in the operating state of any one of the plurality of first virtual machines of the main system; and a configuration setting unit that associates the first virtual machine of the main system whose index exceeds a predetermined criterion with the second virtual machine of the standby system as a switching destination when the failure occurs.

According to the second solving means of the present invention, it is provided a method of creating a failure recovery system for a plurality of first virtual machines of a main system that provides a given communication service, the method comprising:

monitoring at least any one of a configuration change and an operating state of the plurality of first virtual machines of the main system;

updating an index indicative of a possibility that the failure occurs when detecting the configuration change or the change in the operating state of any one of the plurality of first virtual machines of the main system; and associating the first virtual machine of the main system whose index exceeds a predetermined criterion with a second virtual machine of the standby system as a switching destination when the failure occurs, wherein the second virtual machine of a standby system is a virtual machine whose power supply state is a semi-operating state, which is used as a switching destination for recovering failure when the failure occurs in any one of the plurality of first virtual machines of the main system.

It is possible, according to the present invention, to provide a failure recovery system which reduces the amount of physical resources of the standby system VM as much as possible, recovers the main system VM in the failure recovery time as short as possible when failure occurs, and appropriately recovers the failure of the plural main system VMs, and a method of creating the failure recovery system.

BRIEF DESCRIPTION OF THE DRAWINGS

FIG. 5 illustrates an example of a pattern management table according to this embodiment;

FIG. 6 illustrates an example of a VM management table according to this embodiment;

FIG. 7 illustrates an example of a configuration management table according to this embodiment;

DETAILED DESCRIPTION OF THE INVENTION

First, an outline of an embodiment will be described. A common standby system VM is produced on the basis of a configuration of a main system VM that runs a communication service. In this example, it is assumed that the configuration of the main system VM and the amount of physical resources to be allocated are patterned and provided, and the environment is created in the common standby system VM according to the configuration of the standby system VM and the amount of physical resources. Therefore, the environment such as a redundant configuration of N+M in which when N (N is a natural number of 2 or more) main system VMs are provided, M (M is a natural number of 1 or more) standby system VMs are prepared is created.

Subsequently, a power supply control of the related standby system VM is conducted according to an operating state such as a CPU utilization ratio of the respective main system VMs, or event information such as a configuration change of the main system VMs. In the power supply control, two types of power supply states including a standby state in which operating information is held in a memory, and a storage device such as a hard disk stops, and a stop state in which a power supply completely stops are set. As a result, the amount of physical resources used by the standby system VM can be reduced. Also, in the setting of the power supply control, weighting is conducted according to the operating state of the main system VM or the event state (for example, an index is obtained for each of the main system VMs) so that the main system VM having great possibility that the failure occurs is extracted, and a power supply state of the standby system VM to be switched when the failure occurs in the main system VM is set to the standby state. As a result, a recovery time at the time of failure can be reduced.

Also, a standby system VM whose power supply state is set to a stop state is prepared separately, for the plural main system VMs to be switched to the common standby system VM at the time of failure. In this example, the standby system VM whose power supply state is thus set to the stop state is called "auxiliary system VM". The auxiliary system VM is used as a switching destination of the main system VM whose failure has not been recovered by the standby system VM at the time of failure. As a result, the failure recovery can be conducted even when failure occurs in the plural main system VMs.

Hereinafter, an embodiment will be described with reference to the accompanying drawings. This embodiment exemplifies appliance devices 101 that deals with a failure by a redundant configuration equipped with standby system virtual servers 104 common to plural main system virtual servers 103.

Figure 1:
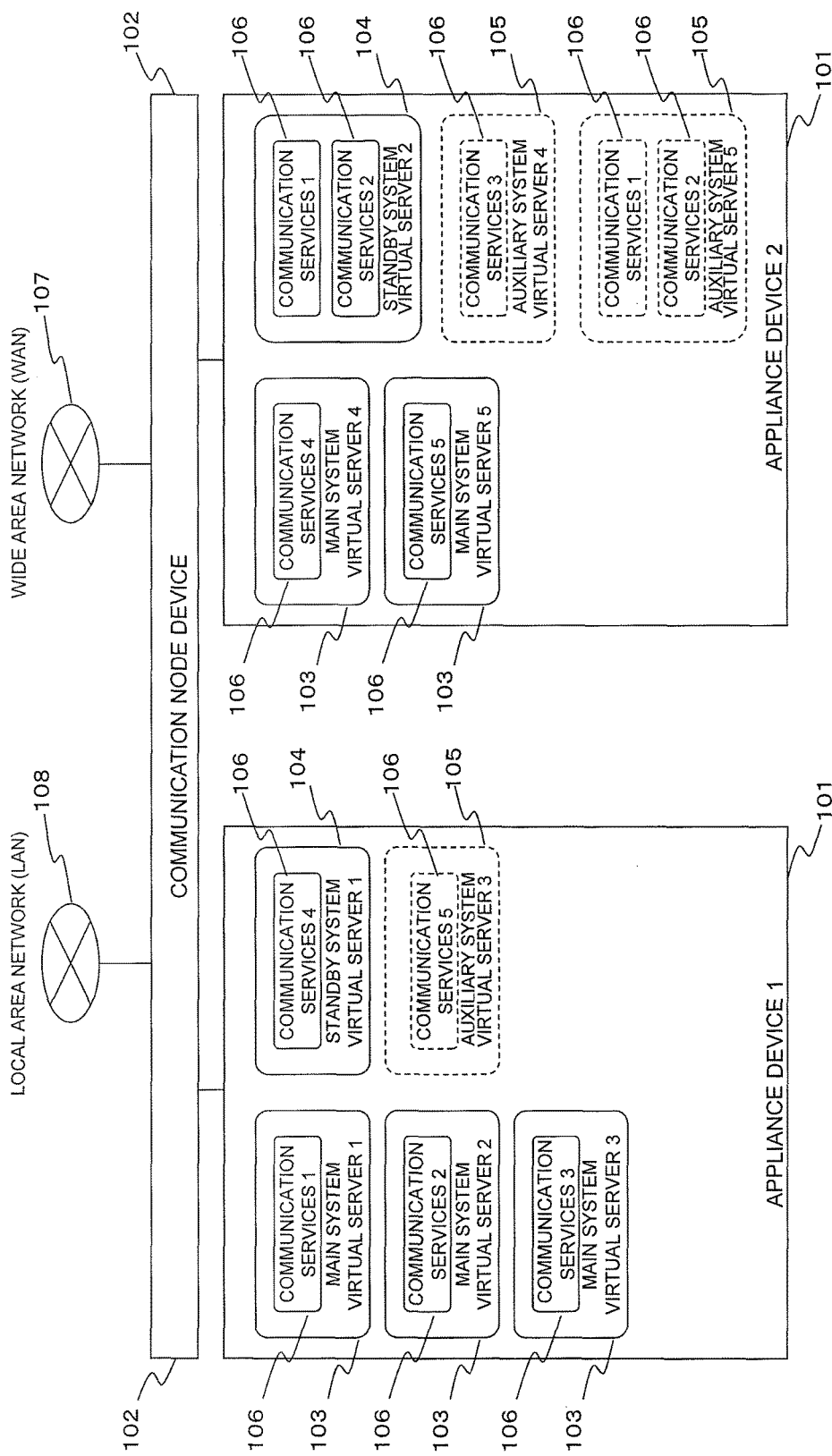
FIG. 1 is an exemplary configuration diagram of an appliance device employing a virtualization mechanism which is a preamble of this embodiment.

FIG. 1 is an exemplary configuration diagram of an appliance device employing a virtualization mechanism. In an example of FIG. 1, a communication node device 102 and the appliance devices 101 are installed in a communication path of a WAN 107 and a LAN 108, and a communication control between the WAN 107 and the LAN 108 is executed by communication services 106 within the appliance devices 101. For example, when a WAN acceleration technique is provided as the communication services 106, a communication speed of the WAN 107 can be improved.

In the appliance devices 101, a virtualization mechanism is applied, and the communication services 106 run on the main system virtual servers (first virtual machines of a main system) 103. Also, the communication services 106 are distributed into the plural appliance devices 101 (appliance devices 1 and 2 which are hereinafter referred to as "appliance devices 101-1 and 101-2"). The communication path is controlled to the communication services 106 to be executed by the communication node device 102. In the communication control (communication path control), for example, the communication control can be conducted with the use of a VLAN (virtual local area network) configuring a virtual network. In this embodiment, the communication path is controlled by the communication node device 102. The communication node device 102 may be incorporated into the appliance devices 101.

Each of the appliance devices 101 is equipped with the standby system virtual server (second virtual machines of a standby system) 104 and auxiliary system virtual servers (second virtual machines of an auxiliary system, third virtual machine of the auxiliary system) 105. When failure occurs in the main system virtual servers 103 in each of the appliance devices 101, the system is switched to another to restart the communication services 106. Different power supply states are set in the standby system virtual server 104 and the auxiliary system virtual servers 105. The power supply state of the standby system virtual server 104 is a standby state in which a storage device such as a hard disk stops in a state where operating information is held in a memory, and the power supply state of the auxiliary system virtual servers 105 is a stop state in which the power supply stops.

Figure 2:
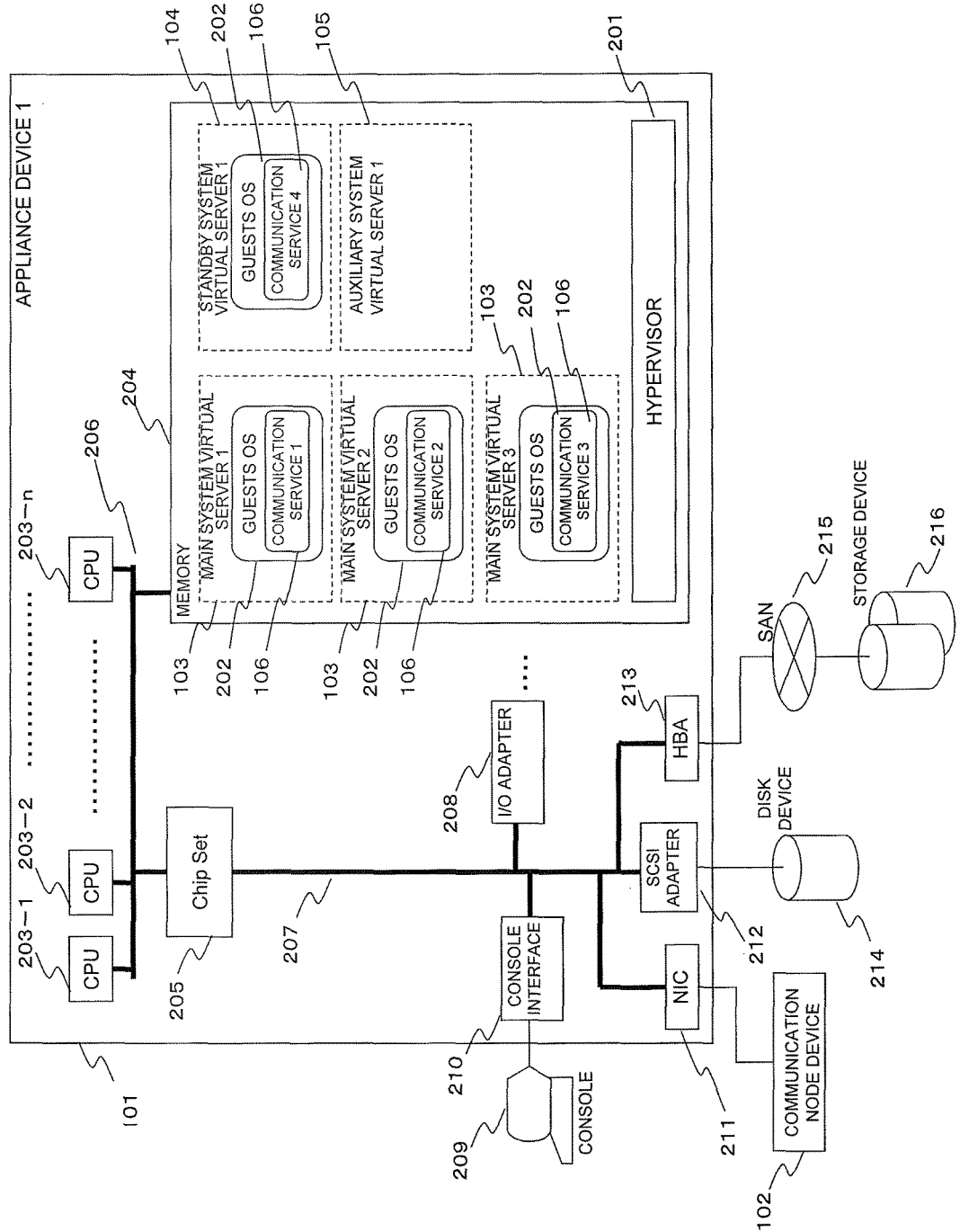
FIG. 2 is an exemplary configuration diagram of an appliance device according to this embodiment.

FIG. 2 is an exemplary configuration diagram of each of the appliance devices 101. In this example, a state of the appliance device 101-1 in FIG. 1 will be described. The appliance device 101-2 is different in the contents of the virtual server from the appliance device 101-1, but identical in the configuration of the device with the appliance device 101-1.

The appliance device 101 includes one or more (one or plural) CPUs 203, and the CPUs 203 is connected to a chip set 205 through an interconnect 206 such as a QPI (quick path interconnect) or an SMI (scalable memory interconnect).

The chip set 205 is connected through a bus 207 such as a PCI (peripheral component interconnect) express to an I/O adapter 208, an NIC (network interface card) 211 connected to the communication node device 102, an SCSI (small computer system interface) adapter 212 connected to a disk device 214, an HBA (host bus adapter) 213 connected to a SAN (storage area network) 215, and a console interface (console I/F) 210 connected to a console 209.

Each of the CPUs 203 accesses to a memory 204 through the interconnect 206, and accesses to the NIC 211 from the chip set 205 to conduct given processing.

A hypervisor 201 is loaded into the memory 204, and guests OS 202 operate in the main system virtual servers 103 and the standby system virtual server 104 which are controlled by the hypervisor 201. The auxiliary system virtual server 105 has a power supply kept in a stop state, but only a definition of the auxiliary system virtual server 105 is registered in the memory 204.

Figure 3:
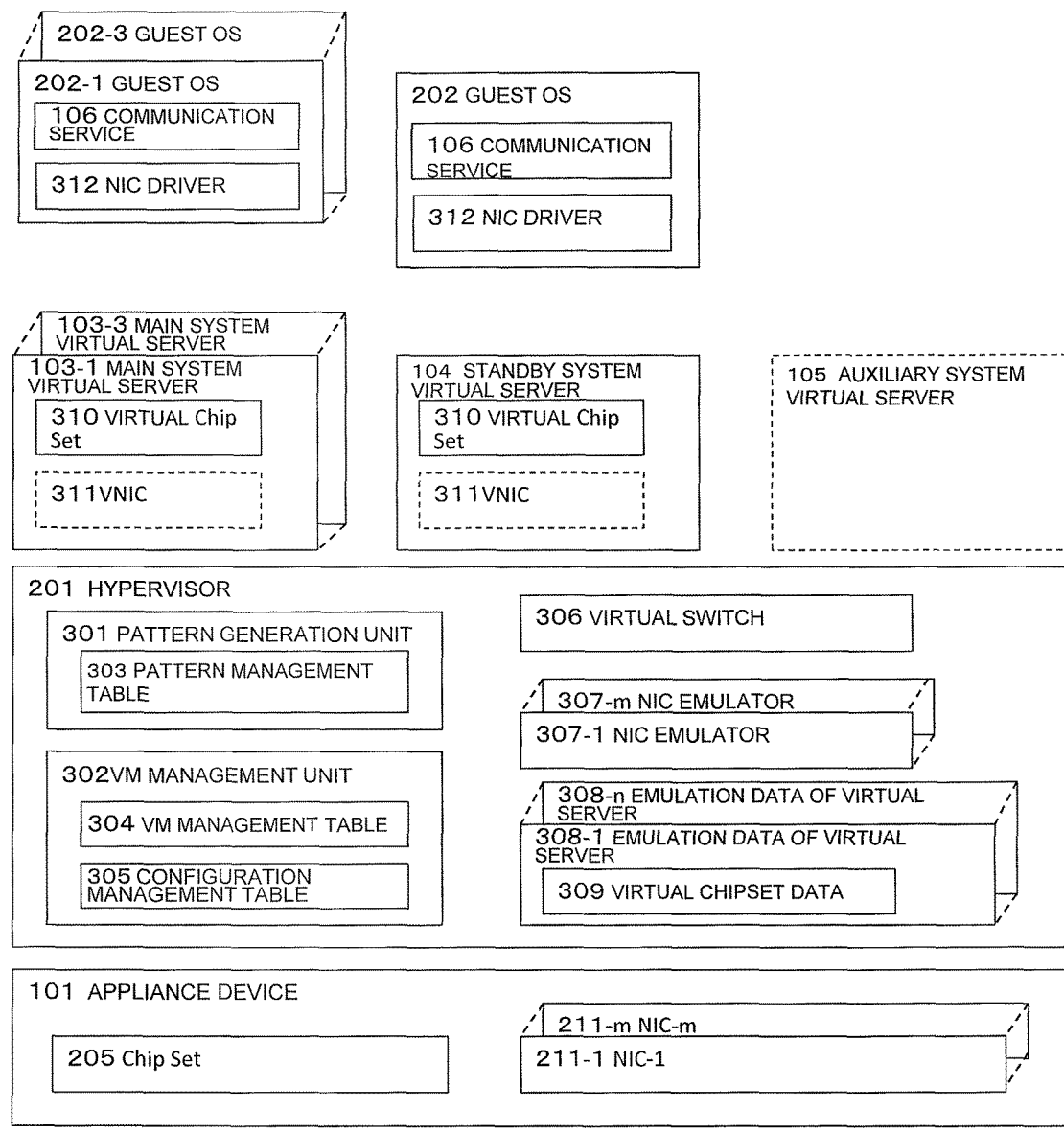
FIG. 3 is an exemplary stack diagram illustrating a relationship between the appliance device and software according to this embodiment.

Subsequently a description will be given of a main portion of a software configuration that realizes the main system virtual servers 103 and the standby system virtual server 104 on the appliance device 101, and hardware elements to be controlled with reference to FIG. 3. The hypervisor 201 that controls one or more main system virtual servers 103, and the standby system virtual server 104 operates on the appliance device 101.

The hypervisor 201 constructs the main system virtual servers 103 and the standby system virtual server 104, and covalently or exclusively allocates arbitrary virtual NICs (VNICs) 311 to the main system virtual servers 103 and the standby system virtual server 104. In the case of the covalent allocation, the hypervisor 201 selects the main system virtual servers 103 or the standby system virtual server 104 which is a communication destination, and communicates with the NIC 211 through a virtual switch 306. In the case of the exclusive allocation, any main system virtual server 103 communicates directly with the NIC 211.

The hypervisor 201 includes an emulation data 308 that holds states of the main system virtual servers 103 and the standby system virtual server 104, and a pattern generation unit (configuration setting unit) 301 that manages the configurations of the standby system virtual server 104 and the auxiliary system virtual servers 105. The hypervisor 201 also includes a pattern management table 303 that associates the main system virtual servers 103 with the standby system virtual server 104 or the auxiliary system virtual servers 105, a VM management unit (virtual machine management unit) 302 that monitors an operating state of the main system virtual servers 103 on the appliance device 101, and a VM management table 304 that manages an operating state of the main system virtual servers 103 and event information. The hypervisor 201 further includes a configuration management table 305 that manages the amount of resources in the appliance device 101, and the virtual switch 306 that forms a communication path of the main system virtual servers 103 or the standby system virtual server 104. Each of the respective tables may not be always configured by a table format, but may be configured by a storage area of an appropriate form.

The emulation data 308 of the main system virtual servers 103 includes a virtual chipset data 309 to be provided to the main system virtual servers 103. The virtual chipset data 309 holds a state of a register to be held by the virtual chipset data 309.

The pattern generation unit 301 records configuration information of the standby system virtual server 104 and the auxiliary system virtual servers 105 generated according to the configuration information of the main system virtual servers 103, and association information of the standby system virtual server 104 or the auxiliary system virtual servers 105 with the main system virtual servers 103 in the pattern management table 303. The pattern generation unit 301 creates the environments of the standby system virtual server 104 and the auxiliary system virtual servers 105 on the basis of the pattern management table 303. The details of the pattern management table 303 will be described later.

The VM management unit 302 records the amount of physical resources in the appliance device 101 in the configuration management table 305, records the configuration information and the operating information of the main system virtual servers 103 in the VM management table 304, and monitors the operating state of the main system virtual servers 103. The VM management unit 302 may monitor both of the configuration information and the operating information of the main system virtual servers 103, or may monitor any one of those information. The details of the VM management table 304 and the configuration management table 305 will be described later.

Figure 4:
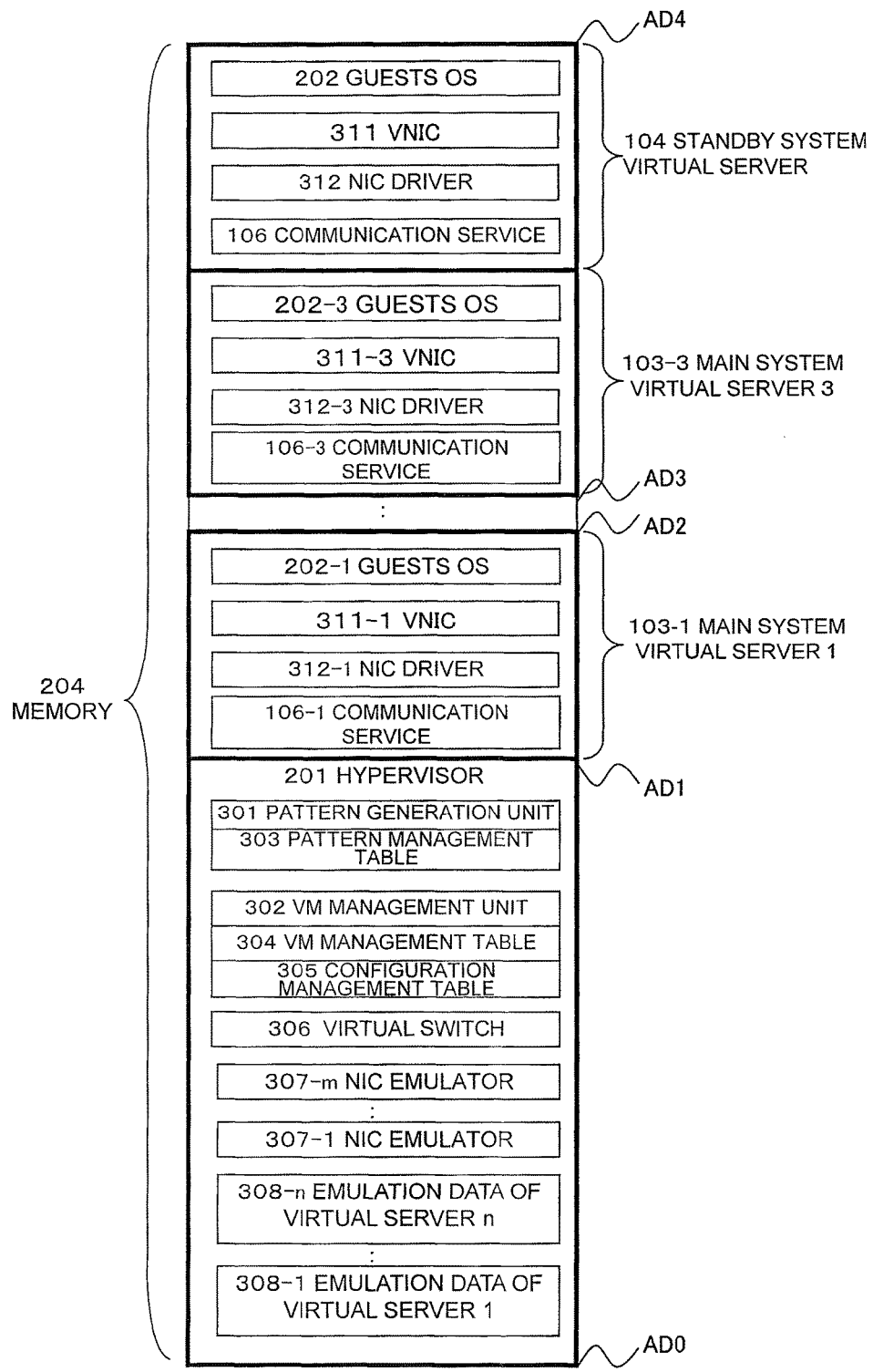
FIG. 4 illustrates an example of memory contents according to this embodiment.

FIG. 4 illustrates an example of the memory 204 managed by the hypervisor 201.

The hypervisor 201 allocates an area used by the hypervisor 201 per se, and areas used by the main system virtual servers 103 and the standby system virtual server 104 onto the memory 204. For example, as illustrated in FIG. 4, the hypervisor 201 allocates addresses AD0 to AD1 to the area of the hypervisor 201, and allocates addresses AD1 to AD2 to the main system virtual server 103-1, and addresses AD2 to AD3 to the main system virtual server 103-3, and addresses AD4 to AD5 to the standby system virtual server 104, respectively.

The guests OS 202, a VNIC 311, an NIC driver 312, and the communication service 106 are stored in the areas used by the respective main system virtual servers 103 and the standby system virtual server 104.

In the area used by the hypervisor 201 are stored the emulation data 308 of the main system virtual servers 103 and the standby system virtual server 104, the pattern generation unit 301, the pattern management table 303, the VM management unit 302, the VM management table 304, the configuration management table 305, an NIC emulator 307, and the virtual switch 306.

FIG. 5 illustrates a configuration example of the pattern management table 303. The pattern management table 303 holds information related to association of the standby system virtual server 104 and the auxiliary system virtual servers 105 which are switching destinations when the main system virtual servers 103 is in failure. In this table are registered the configuration information of the main system virtual servers 103, the standby system virtual server 104, and the auxiliary system virtual servers 105.

The pattern management table 303 includes a secondary information (standby system/auxiliary system information) 500, and a primary information (main system information) 501. The configuration information on the standby system virtual server 104 and the auxiliary system virtual servers 105 matched to the configuration information of the main system virtual servers 103 is registered in an item of the secondary information 500 of this table. The configuration information on the main system virtual servers 103 whose switching destination at the time of failure is the standby system virtual server 104 or the auxiliary system virtual servers 105 is registered in the items of the primary information 501.

In the items of the secondary information 500 in the pattern management table 303 are registered, for example, identification information (Pattern# 502) on the configuration information of the standby system virtual server 104 and the auxiliary system virtual servers 105 matched to the configuration information of the main system virtual servers 103, identification information (S-VM# 503) on the standby system virtual server 104 and the auxiliary system virtual servers 105, the number of CPU cores (S-CPU 504) allocated, identification information (S-VNIC# 506) on the VNIC 311, identification information (S-PNIC# 507) on the NIC 211 that communicates with the VNIC 311, an allocation method (S-VNIC states 508) on the VNIC 311, a set power supply state (Power Status 509), identification information (S-Blade# 510) on the appliance device 101 equipped with the standby system virtual server 104 and the auxiliary system virtual servers 105, identification information (S-Chassis# 511) on a chassis equipped with the appliance device 101, and a utilization state (Status 512) of the auxiliary system virtual servers 105. The identification information on the respective configuration and information used in this embodiment may use, for example, numbers such as serial numbers allocated to the respective configurations and information, or may use appropriate identifiers.

In the power status 509, for example, "standby" is registered in a standby state where a storage device such as hard disk stops in a state where the operating information is held in the memory 204. For example, "down" is registered in a stop state where the power supply completely stops. Also, in the status 512, for example, "main" is registered in the standby system virtual server 104 or the auxiliary system virtual servers 105 which are targets of the power supply control, and for example, "reserve" is registered in the auxiliary system virtual servers 105 which are not the target of the power supply control. The auxiliary system virtual servers 105 in which the "reserve" is registered is used for failure recovery of the main system virtual servers 103 whose failure has not been recovered in the standby system virtual server 104.

In the item of the primary information 501 in the pattern management table 303 are registered, for example, identification information (P-VM# 513) on the main system virtual servers 103, identification information (P-VNIC# 514) on the VNIC 311, an allocation method (P-VNIC States 515) of the VNIC 311, an IP address (IP 516) set in the VNIC 311, an IP address (IP 516) set in the VNIC 311, a MAC address (MAC 517) set in the VNIC 311, identification information (P-PNIC# 518) of the NIC 211 that communicates with the VNIC 311, identification information (P-Blade# 519) on the appliance device 101 equipped with the main system virtual servers 103, identification information (P-Chassis# 511) on a chassis equipped with the appliance device 101, a flag (Power Setup 521) allocated with the standby system virtual server 104 as the switching destination of the main system virtual servers 103, and priority (Priority 522) of the failure recovery of the main system virtual servers 103.

In the power setup 521, when the main system virtual server 103 is in failure, when the standby system virtual server 104 is allocated to the switching destination, "1" is registered and when the auxiliary system virtual server 105 is allocated, "0" is registered. Also, in the priority 522, the priority of the failure recovery of the main system virtual servers 103 is registered, and the main system virtual servers 103 whose numeral value of the priority is larger are preferentially subjected to the failure recovery.

FIG. 6 is a configuration example of the VM management table 304. The VM management table 304 holds a state of the main system virtual servers 103 that operates on the appliance device 101. In this table, the configuration information, the operating information, and the event information on the main system virtual servers 103 are registered.

In the items of the VM management table 304 are registered, for example, date (date 600) when the configuration information or the operating information are acquired, identification information (VM#601) on the main system virtual servers 103, the number of CPU cores allocated (CPU Core 602), a state (CPU status 603) of the allocated CPU 203, a memory capacity (memory 604), identification information (VNIC# 605) on the VNIC 311, an allocation method (VNIC States 606) of the VNIC 311, identification information (PNIC# 607) on the NIC 211 that communicates with the VNIC 311, identification information (Blade# 608) on the appliance device 101 equipped with the main system virtual servers 103, identification information (Chassis# 609) on the chassis equipped with the appliance device 101, an IP address (IP 516) set in the VNIC 311, a MAC address (MAC517) set in the VNIC 311, a utilization ratio (CPU Usage 610) of the CPUs 203, the number of I/O (IOPS 611), a usage rate (Memory Usage 612) of the memory 204, an index (event count 6213) of a failure symptom, a threshold value (threshold 614) that switches the power supply control, and a priority (priority 522) of the failure recovery of the main system virtual servers 103.

In an example of FIG. 6, the configuration information corresponds to, for example, symbols 601 to 609, 516, and 517, the operating information corresponds to symbols 610 to 612, and the event information corresponds to symbol 613. The configuration information and the operating information may include a part of the information illustrated.

The IP 516, the MAC517, and the priority 522 are identical with the items of the pattern management table 303. Also, in the VNIC states 606, "S" is registered when the VNIC 311 is allocated by sharing, and "D" is registered when the VNIC 311 is allocated exclusively. The same is applied to the S-VNIC states 508 and the P-VNIC states 515 in the pattern management table 303.

FIG. 7 illustrates a configuration example of the configuration management table 305. The configuration management table 305 holds the configuration information on the appliance device 101. In this table is registered the amount of physical resources mounted in the appliance device 101.

In the items of the configuration management table 305 are registered, for example, a date (date 600) when the configuration information is acquired, identification information (chassis# 609) on the chassis equipped with the appliance device 101, identification information (blade# 608) on the appliance device 101, a total number of CPU mounted (total CPU 700), a total memory capacity (total memory 701), a total number of VNIC (total VNIC# 702), a total number of NIC (total PNIC#), and identification information (PCIN# 705) on the NIC 211 and a bandwidth (bandwidth 706) on the NIC 211 as information (PNIC Info 704) of the NIC 211.

Figure 8:
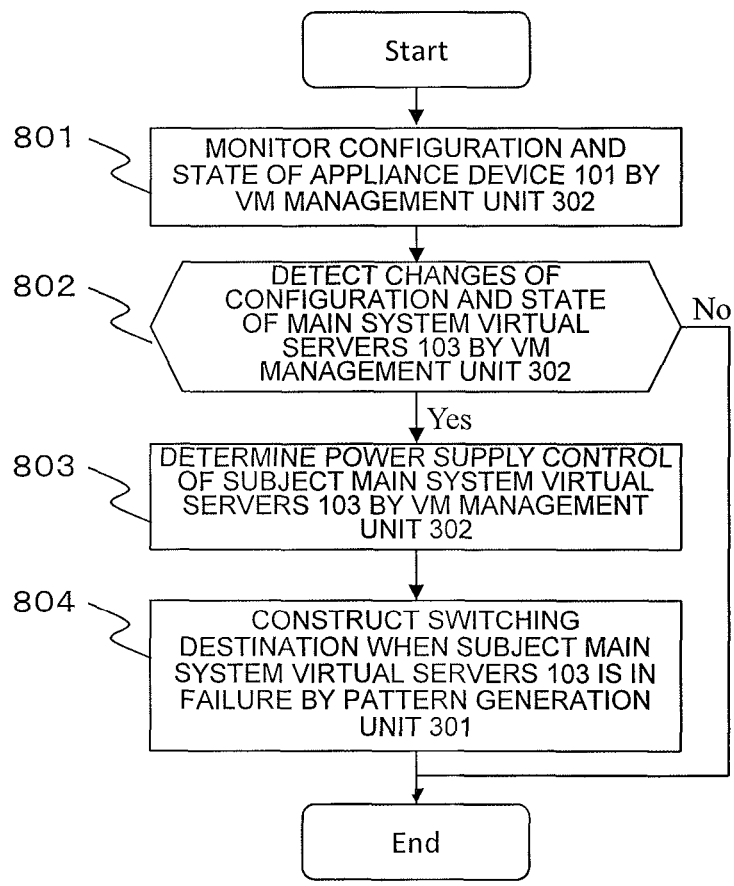
FIG. 8 is an exemplary flowchart illustrating overall processing in normal operation according to this embodiment.

Subsequently an outline of the processing in the normal operation according to this embodiment will be described with reference to FIG. 8.

First, the configuration information on the appliance device 101, and the operating information on the main system virtual servers 103 as a state of the appliance device 101 are acquired, and monitored in the VM management unit 302 (801). The information thus acquired is registered in the respective items of the VM management table 304. The VM management unit 302 detects a state change of the main system virtual servers 103 according to the configuration information and the operating information registered in the VM management table 304 (802), and determines the power supply control of the standby system virtual server 104 and the auxiliary system virtual servers 105 switched when the main system virtual server 103 determined as the state change is in failure (power supply control determining process: 803). The standby system virtual server 104 or the auxiliary system virtual servers 105 is selected as the switching destination of the main system virtual servers 103 at the time of failure according to the determination of the power supply control. The VM management unit 302 notifies the pattern generation unit 301 of the selection results. The pattern generation unit 301 that has received this notification creates the environments of the standby system virtual server 104 or the auxiliary system virtual server 105 which becomes the switching destination when the subject main system virtual servers 103 is in failure (804).

Figure 9:
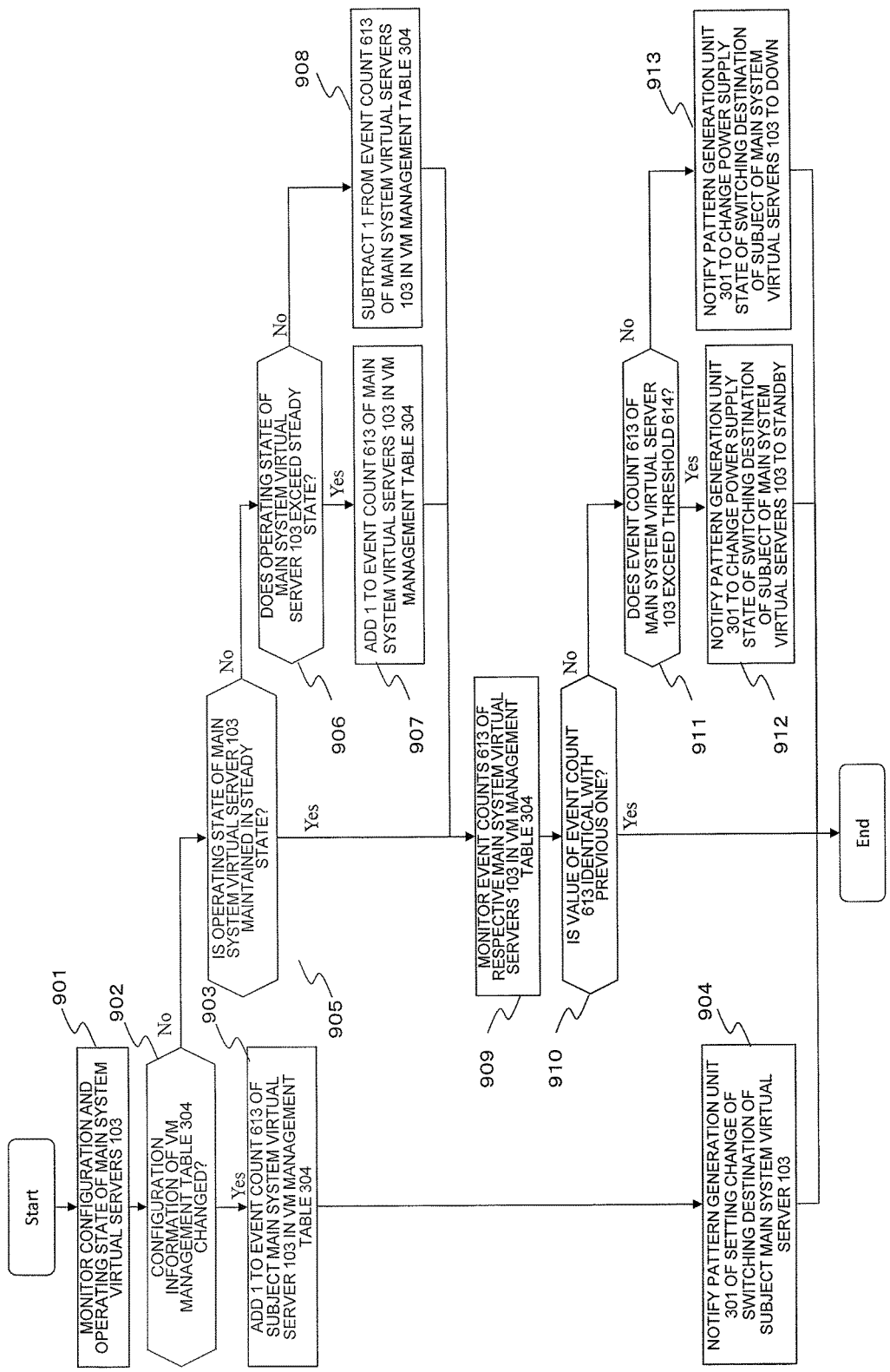
FIG. 9 is an exemplary flowchart illustrating processing of a VM management unit according to this embodiment.

FIG. 9 is an exemplary flowchart of a power supply control determining process which is executed in the VM management unit 302 in the normal operation.

The VM management unit 302 monitors the configuration and the operating state of the main system virtual servers 103 according to registered information in the VM management table 304 (901), when the configuration information registered in the VM management table 304 is changed (902), increments the event count 613 in the VM management table 304 related to the main system virtual servers 103 to be changed by, for example, 1 (903), and notifies the pattern generation unit 301 of the setting change which is a switching destination when the main system virtual servers 103 to be changed is in failure (904). The event count 613 is an index for determining the failure symptom, and in this embodiment. The event count 613 determines that a possibility that failure occurs is high if the index is larger than a predetermined threshold value, and determines that a possibility that failure occurs is low if the index is smaller than the predetermined threshold value. In this example, because there is a possibility that the failure is caused by the configuration change of the main system virtual servers 103, a processing for increasing this index is conducted. Also, although not specified in FIG. 9, if the index is not varied within a given period, a process for decreasing the value is executed. A magnitude of the index may be reverse, and in this case, a relationship between the magnitude of the index, and the possibility of the failure becomes also reverse.

On the other hand, if the configuration information is not changed (902), the VM management unit 302 determines whether the operating state of the main system virtual servers 103 maintains a steady state, or not (905). This steady state becomes a criterion for determining whether the load applied to the main system virtual servers 103 increases or decreases. A determination index such as a moving average value of the operating information in a certain period, or the degree of variation of the operating information may be set, and that those values fall within given values may be determined as the steady state. Apart from the above-mentioned examples, the determination index may be arbitrarily set by a manager. If the operating state of the main system virtual servers 103 exceeds the steady state (if the determination index exceeds an upper limit) (906), a higher load than the normal load is applied to the main system virtual servers 103, resulting in a possibility that failure such as hang-up occurs. Therefore, the VM management unit 302 adds 1 to the event counter 613 (907). On the other hand, if the operating state of the main system virtual servers 103 is lower than the steady state (if the determination index falls below a lower limit), the utilization frequency of the main system virtual servers 103 is low, and failure hardly occurs. Therefore, the VM management unit 302 subtracts 1 from the event count 613 (908).

The value added to the event count uses not only the same value (1 in this example) between Steps 903 and 907, but also different values. For example, if the value added in Step 903 is set to be larger than the value added in Step 907, the power supply control determination giving a larger weight to a change of the configuration information can be conducted. Also, the added value may be different from the subtracted value.

After the operating state of the main system virtual servers 103 has been confirmed, the event count 613 in the respective main system virtual servers 103 registered in the VM management table 304 is monitored (909), and whether the event count 613 is the same value as that in a previous time, or not (910). If the event count 613 is not changed, because there is no change in the confirmation and the operating state, the control is completed without partially conducting processing.

If a value of the event count 613 is changed, the threshold determination of whether the value exceeds the threshold 614, or not, is conducted (911). The threshold 614 is a threshold value for determining the possibility of the failure, and may be arbitrarily set by the manager, or may be set on the basis of a failure history. If the value exceeds the threshold 614, it is determined that the possibility of failure is high, and the pattern generation unit 301 is notified to change the power supply state of the switching destination of the subject main system virtual servers 103 to the standby state (changed to the standby system virtual server 104) (912). If the switching destination of the main system virtual servers 103 has already been in the standby state, the notification may be omitted. Also, if the value does not exceed the threshold, it is determined that the possibility of the failure is low, and the pattern generation unit 301 is notified to change the power supply state of the switching destination of the subject main system virtual servers 103 to the stop state (changed to the auxiliary system virtual servers 105) (913). If the switching destination of the main system virtual servers 103 has already been in the stop state, the notification may be omitted. In the notification, the configuration information of the subject main system virtual servers 103 and the configuration management table 305 are transmitted together.

Figure 10:
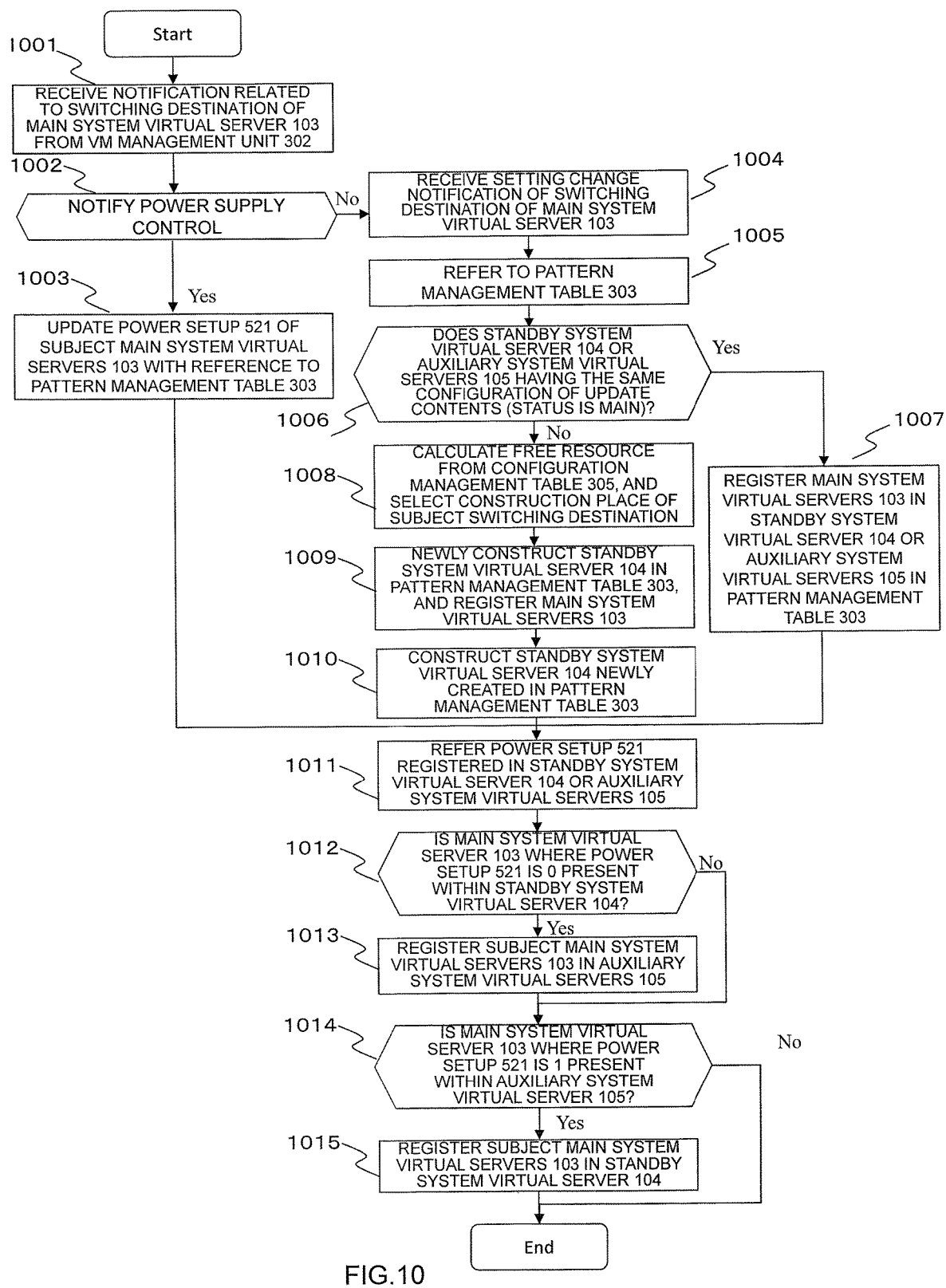
FIG. 10 is an exemplary flowchart illustrating processing of a pattern generation unit in the normal operation according to this embodiment.

FIG. 10 is an exemplary flowchart illustrating processing of building the switching destination when the main system virtual servers 103 is in failure, which is executed in the pattern generation unit 301 in the normal operation.

When receiving the notification related to the switching destination of the main system virtual servers 103 from the VM management unit 302 (1001), the pattern generation unit 301 determines whether the receive notification is a notification of the configuration change of the main system virtual servers 103, or a change notification of the power supply control of the switching destination of the main system virtual servers 103 (1002).

If the change notification is the change notification of the power supply control (1002), the pattern generation unit 301 updates the power setup 521 corresponding to the subject main system virtual servers 103 to the standby state or the stop state according to the change notification with reference to the pattern management table 303 (1003). In this embodiment, "1" is registered when the power supply state is set to the standby state, and "0" is registered when the power supply state is set to the stop state.

On the other hand, if the change notification is not the change notification of the power supply control (1002), the pattern generation unit 301 determines the change notification as a notification (notification of the set change) of the configuration change (1004). Then, pattern generation unit 301 determines whether the standby system virtual server 104 or the auxiliary system virtual servers 105 having the same configuration as the subject main system virtual servers 103 is present, or not, with reference to the pattern management table 303 (1005) (1006). In this embodiment, for example, if the configurations of the main system virtual servers 103, the standby system virtual server 104, and the auxiliary system virtual servers 105 are patterned, the standby system virtual server 104 or the auxiliary system virtual servers 105 having the same configuration as that of the main system virtual servers 103 can be relatively easily searched. The auxiliary system virtual servers 105 has two kinds of cases that the auxiliary system virtual servers 105 is constructed by the stop notification of the power supply state, and that the auxiliary system virtual servers 105 is constructed in order to assist the failure recovery when the failure occurs in the plural main system virtual servers 103 with the stand by system virtual server 104 as a main switching destination. The information for identifying those cases is registered in the status 512 of the pattern management table 303, "main" is registered in the former case, and "reserve" is registered in the latter case. For that reason, in the determination of this processing, in the auxiliary system virtual servers 105, the auxiliary system virtual servers 105 where "main" is registered in the status 512 is to be compared.

If there is the standby system virtual server 104 or the auxiliary system virtual servers 105 having the same configuration as the main system virtual servers 103 (1006), the pattern generation unit 301 registers the information on the main system virtual servers 103 in correspondence with the information on the standby system virtual server 104 or the auxiliary system virtual servers 105 having the same configuration (1007). Specifically, the information on the main system virtual servers 103 is registered in the primary information 501 corresponding to the standby system virtual server 104 or the auxiliary system virtual servers 105 of the pattern management table 303. In this embodiment, the plural main system virtual servers 103 are defined as the switching destination at the time of failure for the standby system virtual server 104 or the standby system virtual server 104. However, because the auxiliary system virtual servers 105 do not use the physical resources, the auxiliary system virtual servers 105 may be allocated to the individual main system virtual servers 103, separately.

On the other hand, if there is not the same configuration as that of the main system virtual servers 103 (1006), the pattern generation unit 301 calculates the amount of free physical resources according to the configuration management table 305 of the VM management unit 302, and selects the appliance device 101 for newly creating the switching destination of the main system virtual servers 103 (1008). For example, when the configuration management table 305 manages the amount of physical resources of the respective appliance devices 101-1 and 101-2, the pattern generation unit 301 may calculate the amount of free physical resources for each of the appliance devices, and select the appliance device 101 for newly creating the switching destination on the basis of the amount of free physical resources. When the configuration management table 305 manages the amount of physical resources of its own appliance device 101, the configuration management table 305 calculates the amount of free physical resources of its own appliance device 101. If the amount of free physical resources is larger than a predetermined amount, the switching destination may be also set to its own device. If the amount of free physical resources is smaller than the predetermined amount, another appliance device 101 may be selected.

The pattern generation unit 301 newly registers the information on the standby system virtual server 104 as the switching destination of the main system virtual servers 103 in the items of the secondary information 500 of the pattern management table 303, and registers the information on the main system virtual servers 103 in the primary information 501 (1009). The pattern generation unit 301 constructs the standby system virtual server 104 according to the update contents after updating the pattern management table 303 (1010). In this example, if the standby system virtual server 104 is newly registered, the auxiliary system virtual servers 105 may be registered.

After the completion of the above processing, the pattern generation unit 301 refers to the items of the power setup 521 of the main system virtual servers 103 registered in the pattern management table 303 (1011), and determines whether "0" is registered in the power setup 521 corresponding to the standby system virtual server 104, or not (1012). If "0" is registered, the pattern generation unit 301 changes a registration destination of the subject main system virtual servers 103 from the standby system virtual server 104 to the auxiliary system virtual servers 105 (1013). For example, the subject main system virtual server 103 is changed to be registered in correspondence with not the standby system virtual server 104, but the auxiliary system virtual servers 105. Also, the pattern generation unit 301 determines whether "1" is registered in the item of the power setup 521 corresponding to the auxiliary system virtual servers 105, or not (1014). If "1" is registered, the pattern generation unit 301 changes the registration destination of the subject main system virtual servers 103 from the auxiliary system virtual servers 105 to the standby system virtual server 104 (1015). For example, the subject main system virtual server 103 is changed to be registered in correspondence with not the auxiliary system virtual servers 105, but the standby system virtual server 104.

The process of changing the registration destination of the main system virtual servers 103 according to the value of the power setup 521 described above is exemplary, and if the standby system virtual server 104 or the auxiliary system virtual servers 105 to be changed which are the registration destinations is absent, the standby system virtual server 104 or the auxiliary system virtual servers 105 is newly constructed. Also, if the main system virtual server 103 to be registered is eliminated from a certain standby system virtual server 104 or the auxiliary system virtual servers 105 due to the registration change of the main system virtual servers 103, the standby system virtual server 104 or the auxiliary system virtual servers 105 may be deleted.

Figure 11:
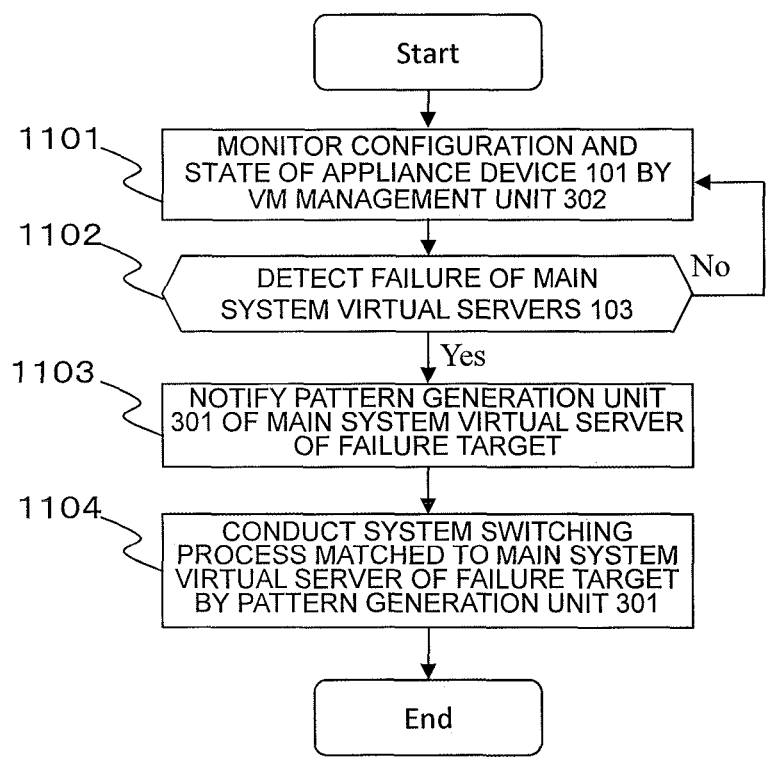
FIG. 11 is an exemplary flowchart illustrating overall processing when failure occurs according to this embodiment.

FIG. 11 is an exemplary flowchart illustrating the overall processing when the failure occurs in this embodiment. The processing when the failure occurs in this embodiment will be described with reference to FIG. 11.

The configuration information of the appliance device 101, and the operating state of the main system virtual servers 103 as the state of the appliance device 101 are acquired, and monitored in the VM management unit 302 (1101). If a communication with, for example, the main system virtual servers 103 is interrupted, the VM management unit 302 determines that failure occurs in the main system virtual servers 103 (1102), and notifies the pattern generation unit 301 of the information on the main system virtual servers 103 of the failure target (1103). The pattern generation unit 301 executes the switching process of the received main system virtual servers 103 of the failure target to conduct the failure recovery (1104). The failure of the main system virtual servers 103 may be an appropriate failure.

Figure 12:
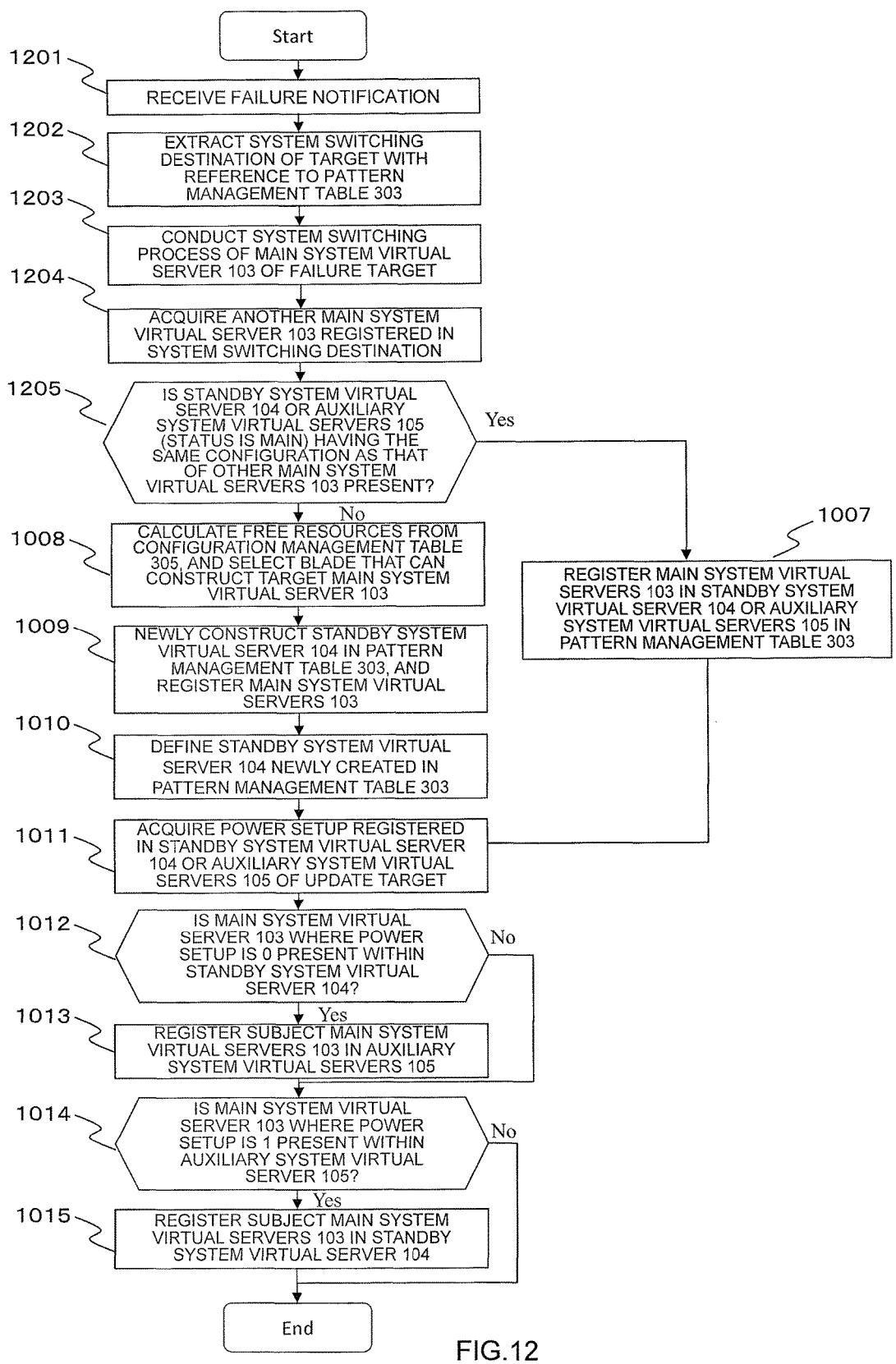
FIG. 12 is an exemplary flowchart illustrating processing of the pattern generation unit when failure occurs according to this embodiment.

FIG. 12 is an exemplary flowchart of the system switching process within the pattern generation unit 301 when the failure occurs. In this processing, because the same processing as that of the pattern generation unit 301 in the normal operation is partially conducted, processing different from that in FIG. 10 will be described.

When the pattern generation unit 301 receives the failure notification related to the main system virtual servers 103 of the failure target from the VM management unit 302 (1201), the pattern generation unit 301 extracts the switching destination corresponding to the main system virtual servers 103 of the failure target with reference to the pattern management table 303 (1202). Specifically, the pattern generation unit 301 searches the main system virtual servers 103 of the failure target registered in the items of the primary information 501 in the pattern management table 303, and extracts the standby system virtual server 104 or the auxiliary system virtual servers 105 registered in the secondary information 500 corresponding to the appropriate item as the switching destination.

After the extraction of the switching destination, the pattern generation unit 301 conducts the system switching process from the main system virtual servers 103 of the failure target to the standby system virtual server 104 or the auxiliary system virtual servers 105 (1205). In the system switching process, the information (IP 516, MAC 517, etc.)

on the VNIC 311 is allocated to the main system virtual servers 103 and the standby system virtual server 104, or the auxiliary system virtual servers 105 to conduct the failure recovery. This processing is exemplary, and the communication path may be changed by setting the VLAN for the VINC 411, and changing this VLAN. Also, in the standby system virtual server 104, because the power supply state is the standby state, the communication services 106 can be restarted relatively quickly. In the auxiliary system virtual servers 105, the start-up of the power supply is required, and the restart of the communication services 106 may be delayed. However, because the main system vertical server is weighted according to the index of the failure symptom to select the standby system and the auxiliary system, the possibility of the delay can be lowered.

The main system virtual servers 103 other than the failure target which are registered in correspondence with the standby system virtual server 104 or the auxiliary system virtual servers 105 which is the switching destination do not have the switching destination at the time of failure, but are again registered in correspondence with the standby system virtual server 104 or the auxiliary system virtual servers 105 through the processing in the normal operation within the above-mentioned pattern generation unit 301.

With the above configuration and processing, the standby system virtual server 104 and the auxiliary system virtual servers 105 common to the main system virtual servers 103 are selectively constructed, thereby being capable of reducing the amount of physical resources used in the standby system of the redundant configuration, reducing the failure recovery time when the failure occurs, and appropriately recovering the failure of the plural main system virtual servers 103.

In this embodiment, patterning is conducted by the configuration information of the main system virtual servers 103, but patterning can be also conducted taking the processing performance of the main system virtual servers 103 into account. Specifically, if the utilization ratio of the physical resource allocated to the main system virtual servers 103 is very small, the switching destination at the time of failure can be changed to the standby system virtual server 104 or the auxiliary system virtual servers 105 where the amount of physical resources to be allocated is shrunk. With this configuration, because a larger amount of main system virtual servers 103 can be registered for the standby system virtual server 104 or the auxiliary system virtual servers 105, the amount of physical resources used in the standby system of the redundant configuration can be further reduced.

In the selection of the standby system virtual server 104 and the auxiliary system virtual servers 105, in this embodiment, the configuration change of the main system virtual servers 103 and the change of the operating state are evenly aggregated in the event count 613. Alternatively, the weighting may be changed on the respective state changes to effectively reflect any one of the configuration change and the change in the operating state. Also, the event information such as the number of failure occurrences can be added to the determination criterion other than the configuration change or the change in the operating state, the configuration information when the failure occurs is stored as a history, and the possibility that the failure occurs in the main system virtual servers 103 having the same configuration can be set to be higher.

According to this embodiment, there can be provided the failure recovery system, and the method of creating the failure recovery system, which can reduce the amount of physical resources of the standby system VM as much as possible, recover the failure in the failure recovery time as short as possible at the time of failure, and appropriately recover the failure of the plural main system VM. Also, the amount of physical resources in the standby system VM can be reduced due to the sharing of the standby system VM to the plural main system VMs, and the supply power control of the standby system. VM matched to the operating state or the event information of the main system VM, the failure recovery time can be reduced at the time of failure, and the plural main system VMs can be appropriately subjected to the failure recovery.

The embodiments of the present invention have been described above. However the technical scopes of the present invention are not limited to the scopes described in the embodiments. The invention made by the present inventors has been described specifically on the basis of the embodiments of the present invention, but can be variously changed or improved without departing from the spirit of the invention. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced. Configurations thus changed or improved are also naturally included in the technical scopes of the present invention.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A failure recovery system, comprising:
   a plurality of first virtual machines of a main system that provides a given communication service;
   a second virtual machine of a standby system whose power supply state is a semi-operating state, which is used as a switching destination for recovering failure when the failure occurs in any one of the plurality of first virtual machines of the main system;
   a virtual machine management unit that monitors at least any one of a configuration change and an operating state of the plurality of first virtual machines of the main system, and updates an index indicative of a possibility that the failure occurs when detecting the configuration change or the change in the operating state of any one of the plurality of first virtual machines of the main system; and
   a configuration setting unit that associates the first virtual machine of the main system whose index exceeds a predetermined criterion with the second virtual machine of the standby system as a switching destination when the failure occurs,
wherein the first virtual machines of the main system are configured by a given configuration pattern of the physical resources, and
the configuration setting unit creates the second virtual machine of the standby system having the same configuration pattern as that of the plurality of first virtual machines of the main system;
wherein the configuration setting unit includes a pattern storage area that stores configuration information on the first virtual machines of the main system and configuration information on the second virtual machine in association with each other, and
the plurality of first virtual machines of the main system having the same configuration pattern for each of the second virtual machines of the standby system or the auxiliary system is registered in the pattern storage area, and one or the plurality of virtual machines of the main system having the same configuration for each of the third virtual machines of the auxiliary system are registered in the pattern storage area.

2. The failure recovery system according to claim 1, further comprising a third virtual machine of an auxiliary system whose power supply state is a stop state, which is used as a switching destination when the failure occurs in any one of the plurality of first virtual machines of the main system,
wherein the configuration setting unit associates the first virtual machine of the main system whose index falls below a predetermined criterion with the third virtual machine of the auxiliary system as a switching destination when the failure occurs.

3. The failure recovery system according to claim 1,
wherein the configuration setting unit sets the second virtual machine of the standby system to a virtual machine of the auxiliary system whose power supply state is the stop state if the index falls below a predetermined criterion.

4. The failure recovery system according to claim 1,
wherein the second virtual machine of the standby system is used as a switching destination when the failure occurs in any one of the plurality of first virtual machines of the main system, and the failure recovery system further includes a third virtual machine of an auxiliary system whose power supply state is a stop state, which is used as a second switching destination when the failure occurs in another of the plurality of first virtual machines of the main system,
the first virtual machine of the main system whose index exceeds a predetermined criterion is associated with the third virtual machine of the auxiliary system as a second switching destination when the failure occurs.

5. The failure recovery system according to claim 1,
wherein the index is obtained on the basis of both of the configuration change and the change in the operating state for each of the first virtual machines.

6. The failure recovery system according to claim 1,
wherein, when a real utilization volume of the first virtual machines of the main system is smaller than a predetermined amount of physical resources ensured for the first virtual machines of the main system, the first virtual machines of the main system are associated with the second virtual machines of the standby system having the amount of physical resources corresponding to the real utilization volume.

7. The failure recovery system according to claim 1,
wherein the virtual machine management unit increases the index when the first virtual machines of the main system are changed in configuration, and the operating state thereof is higher than a predetermined load, and
the virtual machine management unit decreases the index when the operating state of the first virtual machines of the main system is lower than the predetermined load.

8. A method of creating a failure recovery system for a plurality of first virtual machines of a main system that provides a given communication service, the method comprising:
monitoring at least any one of a configuration change and an operating state of the plurality of first virtual machines of the main system;
updating an index indicative of a possibility that the failure occurs when detecting the configuration change or the change in the operating state of any one of the plurality of first virtual machines of the main system; and
associating the first virtual machine of the main system whose index exceeds a predetermined criterion with a second virtual machine of the standby system as a switching destination when the failure occurs,
wherein the second virtual machine of a standby system is a virtual machine whose power supply state is a semi-operating state, which is used as a switching destination for recovering failure when the failure occurs in any one of the plurality of first virtual machines of the main system,
wherein the first virtual machines of the main system are configured by a given configuration pattern of the physical resources, and
the method further comprising:
creating the second virtual machine of the standby system having the same configuration pattern as that of the plurality of first virtual machines of the main system,
wherein the plurality of first virtual machines of the main system having the same configuration pattern for each of the second virtual machines of the standby system or the auxiliary system is registered in a pattern storage area, and one or the plurality of virtual machines of the main system having the same configuration for each of the third virtual machines of the auxiliary system are registered in the pattern storage area.

9. The method of creating a failure recovery system according to claim 8, further comprising:
associating the first virtual machine of the main system whose index falls below a predetermined criterion with a third virtual machine of the auxiliary system as a switching destination when the failure occurs,
wherein the third virtual machine of an auxiliary system is a virtual machine whose power supply state is a stop state, which is used as a switching destination when the failure occurs in any one of the plurality of first virtual machines of the main system.

10. The method of creating a failure recovery system according to claim 8, further comprising:
setting the second virtual machine of the standby system to a virtual machine of the auxiliary system whose power supply state is the stop state if the index falls below a predetermined criterion.

11. The method of creating a failure recovery system according to claim 8,
wherein the second virtual machine of the standby system is used as a switching destination when the failure occurs in any one of the plurality of first virtual machines of the main system, and, the first virtual machine of the main system whose index exceeds a predetermined criterion is associated with a third virtual machine of the auxiliary system, as a second switching destination when the failure occurs, the third virtual machine of an auxiliary system whose power supply state is a stop state, which is used as a switching destination when the failure occurs in another of the plurality of first virtual machines of the main system.

12. The method of creating a failure recovery system according to claim 8, further comprising:

obtaining the index on the basis of both of the configuration change and the change in the operating state for each of the first virtual machines.

13. The method of creating a failure recovery system according to claim 8, wherein, when a real utilization volume of the first virtual machines of the main system is smaller than a predetermined amount of physical resources ensured for the first virtual machines of the main system, the first virtual machines of the main system are associated with the second virtual machines of the standby system having the amount of physical resources corresponding to the real utilization volume.

14. The method of creating a failure recovery system according to claim 8, further comprising:

increasing the index when the first virtual machines of the main system are changed in configuration, and the operating state thereof is higher than a predetermined load, and decreasing the index when the operating state of the first virtual machines of the main system is lower than the predetermined load.

\* \* \* \* \*